United States Patent Office 2,910,513
Patented Oct. 27, 1959

2,910,513

HYDROGENATION PROCESS UTILIZING ALUMINUM CHLORIDE COMPLEX CATALYST

John A. Ridgway, Jr., and James M. Stuckey, Texas City, Tex., assignors to The American Oil Company, Texas City, Tex., a corporation of Texas No Drawing. Application December 10, 1956
Serial No. 627,097

10 Claims. (Cl. 260—667)

Our invention relates to catalytic techniques for hydrogenating unsaturated hydrocarbon bonds. More particularly, it is designed to effect selective saturation of unsaturated hydrocarbon bonds while minimizing bond rupture by hydrocracking.

Although there is a reasonably broad range of catalysts which are known to be effective for hydrogenation, the value of such catalysts in general is restricted to use in particular reactions under specific reaction conditions. Particularly, in the case of unsaturated hydrocarbons, the operative conditions for conventional catalysts, e.g., nickel, precious metal or other metal type catalysts, are sufficiently severe as to cause considerable side reaction. It is the object of the present invention to provide a catalyst having high specificity for saturation of unsaturated hydrocarbon bonds under conditions permitting a minimization of hydrocracking.

It has been discovered that complex catalysts containing aluminum, halogen and hydrocarbon radicals have surprising specificity for saturation of unsaturated hydrocarbon bonds by reaction of hydrogen, provided the ratio of aluminum to halogen in the catalyst mixture is maintained within critical limits. The invention is broadly applicable to unsaturated hydrocarbon charge stocks including simple hydrocarbons and mixtures of hydrocarbons such, for example, as are encountered in petroleum refining. Thus, olefinic charge stocks may be hydrogenated according to the invention; e.g., isooctene may be hydrogenated to produce isooctane. Light catalytic cracked gasoline may be hydrogenated in order to stabilize it by conversion of olefins for aviation gasoline production. Cracked gas oil or cycle stocks can be hydrogenated or hydrofined for upgrading with respect to burning quality for use as diesel fuels or as heating oils, or in order to improve quality as catalytic cracking charge stock. Aromatics can be hydrogenated to produce corresponding saturated cyclic compounds; e.g., hydrogenation of benzene to cyclohexane or tetralin to decalin.

In accordance with the invention, the unsaturated hydrocarbon charge stock is contacted with hydrogen at elevated pressure and at a temperature in the range of about 250° to 400° C. in the presence of an aluminum and halogen-containing organo complex catalyst containing in a compositional relationship of aluminum:halogen:hydrocarbon such that the ratio of aluminum to halogen is in the range of about 1:2.25 to 1:1.5 moles. Catalysts containing halogen in the form of chlorine have special value although catalysts containing bromine or iodine or mixed halogens also have utility. It has been found that catalysts are particularly useful which have been prepared in situ by addition of aluminum metal to a charge mixture containing an aluminum halide or an aluminum organo halide in a solvent which advantageously may comprise the unsaturated hydrocarbon stock to be hydrogenated. Sufficient aluminum metal is added to provide a reaction proportion of aluminum to halogen in the above mentioned range. In estimating the proportion of aluminum metal required, account must be taken of any reactable impurities in the feed, e.g., oxygen or sulfur compounds, which may consume aluminum.

The catalysts of the invention can be made by a number of methods. Although various sources of aluminum and halogen, including hydrogen aluminum halides, are acceptable as precursors in the catalyst formation, the aluminum halides ($AlX_3$) or the aluminum sesquihalides ($Al_2R_3X_3$—where R is an organic radical and X is a halogen) have particular value. The useful organo aluminum halides may be prepared by a number of ways; for example, by the reaction of aluminum with a source of active halogen in the presence of or with the addition of unsaturated hydrocarbon, reaction of an aluminum halide and aluminum metal with an olefin such as ethylene, either in the presence or absence of hydrogen; the reaction of an organic halide with aluminum metal; the reaction of an organo aluminum compound, e.g., aluminum triethyl, with an aluminum halide. The ratio of aluminum to halogen then can be readily adjusted as desired by reaction with aluminum halide to increase halogen content or by reaction with aluminum of an organo aluminum compound to decrease halogen. It is particularly advantageous to prepare the catalyst in situ by using the unsaturated hydrocarbon charge, e.g., isooctene, propylene tetramer, a benzene or naphthalene, as the organic complexing agent by addition of the desired concentration of an aluminum halide, followed by addition of aluminum metal in an amount adjusting the ratio of aluminum to halogen in the range of 1:2.25 to 1:1.5 moles.

In the practice of the invention, it has been found that hydrogenation is selectively promoted by the catalysts of the invention at a temperature in the range of about 250° to 400° C., preferably about 350° to 400° C. At temperatures below 300° C., reaction rates tend to be low, and there appears to be no compensating advantage with respect to avoidance of hydrocracking. An advantage in reaction rate is obtained with increasing temperature up to about 400° C. where increasing side reaction as shown by the incidence of hydrocracking and dry gas production imposes a limitation.

The reaction pressure does not appear to be critical, but a pressure in the range of about 500 to 5000 p.s.i.g., advantageously about 1500 to 3500 p.s.i.g., is desirable. The best operating condition will depend on the material being hydrogenated, the temperature of operation, and various design factors influencing economics. The reactants should be maintained in the liquid phase. The reaction time also may be varied depending upon the rate of the particular hydrogenation and the desired degree of conversion. The catalyst concentration may be varied over a considerable range. For example, catalyst concentrations in the range of about 0.1 to 10 weight percent may be employed with olefinic double bonds, and in the range of about 1 to 10 weight percent with aromatic feed stocks. For the hydrogenation of fused ring aromatics, e.g., naphthalenes or tetralins, a concentration in the range of about 3 to 7 weight percent appears to be desirable.

Under the above operating conditions the organo aluminum halides employed would normally decompose. This fact, together with the experimental observation that a solid phase appears to be present in the hydrogenation system, which solid phase appears to be necessary for activity, suggests that the actual catalyst is a condensed structure formed by internal condensation of the aluminum, halogen and organic bonding radicals to produce a solid which may be structually analogous to aluminum carbide. Thus, the formation of the catalyst is believed to result from disproportionation and thermal decomposition of the organo aluminum halide, whether added as such or formed in situ by reaction of aluminum metal or an aluminum halide with an unsaturated hydrocarbon, an organic halide or a metal alkyl, or the like. The formation of the catalyst may be visualized as proceeding according to the following equations:

$$2AlX_3 + Al + 3R \rightarrow 3AlX_2R \quad (R = \text{an organic group})$$
$$3AlX_2R \rightleftarrows Al_2X_3 \equiv R\downarrow + AlX_3 + 2R$$

The $Al_2X_3 \equiv R$ is the insoluble solid to which is ascribed the hydrogenation activity. This hypothesis, however is merely conjectural at the present stage of our knowledge and is not necessary to practice the invention.

Application of the invention will be illustrated by reference to several examples. In the examples described, tetralin is used as the charge stock because it can undergo either double bond hydrogenation by absorption of three moles of hydrogen to produce decalin, or a hydrocracking reaction by absorption of one mole of hydrogen to produce butyl benzene. The course of the reaction, and the capacity of the catalyst for promoting either reaction, can be followed readily by product analysis. The average percent conversion per hour by hydrogenation and by hydrocracking was obtained by assuming (1) hydrocracking involves simple butyl benzene production and (2) hydrogenation involves decalin production. Using these assumptions, the conversion to butyl benzene (hydrocracking) and the conversion to decalin (hydrogenation) were then determined which would be most nearly consistent with reaction pressure drop and product specific gravity, refractive index and percent sulfonatable.

*Example I*

300 gm. of tetralin were charged to a 1400 ml. rocking bomb equipped with a glass liner. In addition to the hydrocarbon, there were introduced 4.0 ml. ethyl aluminum sesquibromide ($Al_2Et_3Br_3$), prepared by the reaction of ethyl bromide with aluminum, and 10.4 gm. aluminum bromide to give an average catalyst composition approximating $AlEt_{0.75}Br_{2.25}$. The reaction vessel was then pressured to 2000 p.s.i.g. with hydrogen, rocking was started and the temperature was brought to 350° C. and held there for 6.5 hours. During the heating-up period the pressure rose to a maximum of 3400 p.s.i.g. and then decreased as hydrogen was consumed. When the pressure dropped to 2500 p.s.i.g., the reactor was repressured with hydrogen to 3500 p.s.i.g.; this operation was repeated as necessary during the course of the run in order to maintain the pressure in the 2500–3500 p.s.i.g. range. The total pressure drop during the run amounted to 4950 p.s.i.g.

At the end of the 6.5 hour period, rocking was stopped and the bomb was allowed to cool. A gas sample was then taken for analysis in order that hydrogen consumption and light hydrocarbon yield might be determined. The reactor was opened, inspected for coke deposits, and the liquid product removed, neutralized and submitted for pertinent analyses. The liquid product had a specific gravity, 60/60, of 0.8849, a refractive index, 25/D, of 1.4851, and was 44.1 weight percent sulfonatable. The average conversion per hour over the run was 8.6% hydrogenation and 4.3% hydrocracking.

*Example II*

In this example, the procedure of Example I was followed, except that 2.2 ml. of ethyl aluminum sesquibromide and 11.3 gm. aluminum bromide were used to give an average catalyst composition of approximately $AlEt_{0.5}Br_{2.5}$. In this run, the principal reaction was found to be hydrocracking, indicating the significance of the ratio of halogen to aluminum in the catalyst composition. There was little or no evidence of simple hydrogenation, and coke formation accompanied the hydrocracking. The average percent conversion per hour was 14.0% for the hydrocracking reaction. The liquid product had the following characteristics: specific gravity, 60/60, of 0.8114, a refractive index, 25/D, of 1.4578, and was 42.6 weight percent sulfonatable.

The results of Examples I and II were confirmed, respecting aluminum to halogen ratio, with other catalysts including chlorides and iodides, and also with other feed stocks, including olefins, aromatics, and substituted aromatics. In tests on different feed stocks, the methyl naphthalenes were found to be particularly susceptible, relative to tetralin, to selective hydrogenation. Comparative runs were also made with cetane as a charge stock in order to confirm the above point respecting catalyst selectivity in view of cetane's susceptibility to cracking and insusceptibility to hydrogenation. The cetane runs also showed that, if desired, a higher halogen ratio catalyst could be used to effect selective hydrocracking of heavy stocks, including reduced crudes, at milder temperature and pressure conditions than normally associated with catalytic hydrocracking.

In other runs following the general procedure of Example I, catalysts were evaluated. It was further determined in these runs that the nature of the hydrocarbon combined with the aluminum and halogen was not a controlling factor in catalyst selectivity. Thus, the hydrocarbon radical can be derived from olefinic or aromatic or paraffinic, depending upon its source, i.e., whether from the charge stock or from an organic reagent used in catalyst preparation. In a typical run with the aluminum modified catalysts, the hydrocarbon charge, e.g., tetralin, was charged to a rocking bomb with the aluminum halide, e.g., aluminum bromide. Aluminum metal was added in an amount providing one/third mole for reaction with the aluminum halide. The bomb then was pressured to 2,000 p.s.i.g. with hydrogen; rocking was started and it was heated to reaction temperature. The temperature was held for the desired reaction time, and hydrogen was added as necessary to keep the reactor pressure above 2500 p.s.i.g. At the termination of the run, the rocking was stopped, the bomb was cooled, and the products were analyzed.

It was found that aluminum modification with at least one/third mole of free aluminum substantially eliminated the coke forming and hydrocracking activity of the aluminum halide or organo aluminum halide catalyst. It was also found that it was desirable to assure reactive surface by adding the aluminum metal in the form of fine shavings or particles rather than coarse shavings. It was also found that improved catalyst performance could be obtained by activating the aluminum, either by treatment with a dilute alcoholic solution of mercuric halide or by mechanically cutting the metal during the reaction so that a fresh surface was continuously exposed to the reactants. Also, a trace of water appeared to be beneficial in promoting the catalyst preparation in the case of catalyst formed by reaction of hydrogen halide and aluminum metal, and in some runs, the use of a metal reactor, particularly a stainless steel reactor, appeared to offer advantages.

A wide variety of halogen sources are available for catalyst preparation including, for example, $I_2$, HBr, HCl, $HgI_2$, $HgBr_2$, $HgCl_2$, $AlI_3$, $AlBr_3$, $AlCl_3$, MeI, etc. A somewhat lower concentration of catalyst appears to be sufficient in the case of aluminum chloride systems compared to aluminum bromide systems, although the bromide catalysts may give somewhat higher conversion rates and better selectivity. In practice, the hydrocarbon charge and catalyst components may be added batchwise to a reactor, and the reactor then may be pressured with hydrogen either before or during the heating of the reactor to the reaction temperature. The process also can be conducted continuously by charging fresh feed plus recycled materials and necessary make-up of catalyst components continuously to a reactor vessel. Reaction mixture may be continuously withdrawn to a separation system for recovery of hydrogen, unreacted or partially reacted charge and the solid catalyst complex for recycle. In the case of the lighter hydrocarbons, an inert saturated hydrocarbon solvent can be used.

We claim:
1. A process for hydrogenating an unsaturated hydrocarbon bond which comprises contacting an unsaturated hydrocarbon charge stock with hydrogen at elevated pressure and a temperature in the range of about 250° to 400° C. in the presence of an aluminum and halogen containing organic complex catalyst which has a compositional relation of aluminum:halogen:hydrocarbon such that the ratio of aluminum to halogen is in the range of about 1:2.25 to 1:1.5 moles.

2. The process of claim 1 in which the halogen is chlorine.

3. The process of claim 1 in which the halogen is bromine.

4. The process of claim 1 in which the halogen is iodine.

5. The process of claim 1 in which the unsaturated hydrocarbon charge stock is olefinic.

6. The process of claim 1 in which the hydrocarbon charge stock is a naphthalene.

7. A process for hydrogenating unsaturated hydrocarbons which comprises charging an unsaturated hydrocarbon and an aluminum halide to a reaction zone, adding aluminum metal sufficient to provide an aluminum to halogen ratio in the range of about 1:2.25 to 1:1.5 moles, and contacting the resulting mixture with hydrogen at elevated pressure and at a temperature in the range of about 250° to 400° C.

8. The process of claim 7 in which the halide is chloride.

9. The process of claim 7 in which the halide is bromide.

10. The process of claim 7 in which the halide is iodide.

References Cited in the file of this patent

UNITED STATES PATENTS

| | | |
|---|---|---|
| 1,835,748 | Behimer | Dec. 8, 1931 |
| 1,952,898 | Stratford | Mar. 27, 1934 |
| 1,954,431 | Stratford | Apr. 10, 1934 |
| 2,271,956 | Ruthruff | Feb. 3, 1942 |
| 2,388,428 | Mavity | Nov. 6, 1945 |
| 2,739,993 | Schneider et al. | Mar. 27, 1956 |